(Model.)
C. A. HUSSEY.
Dynamo Electric Machine.
No. 233,350.  Patented Oct. 19, 1880.
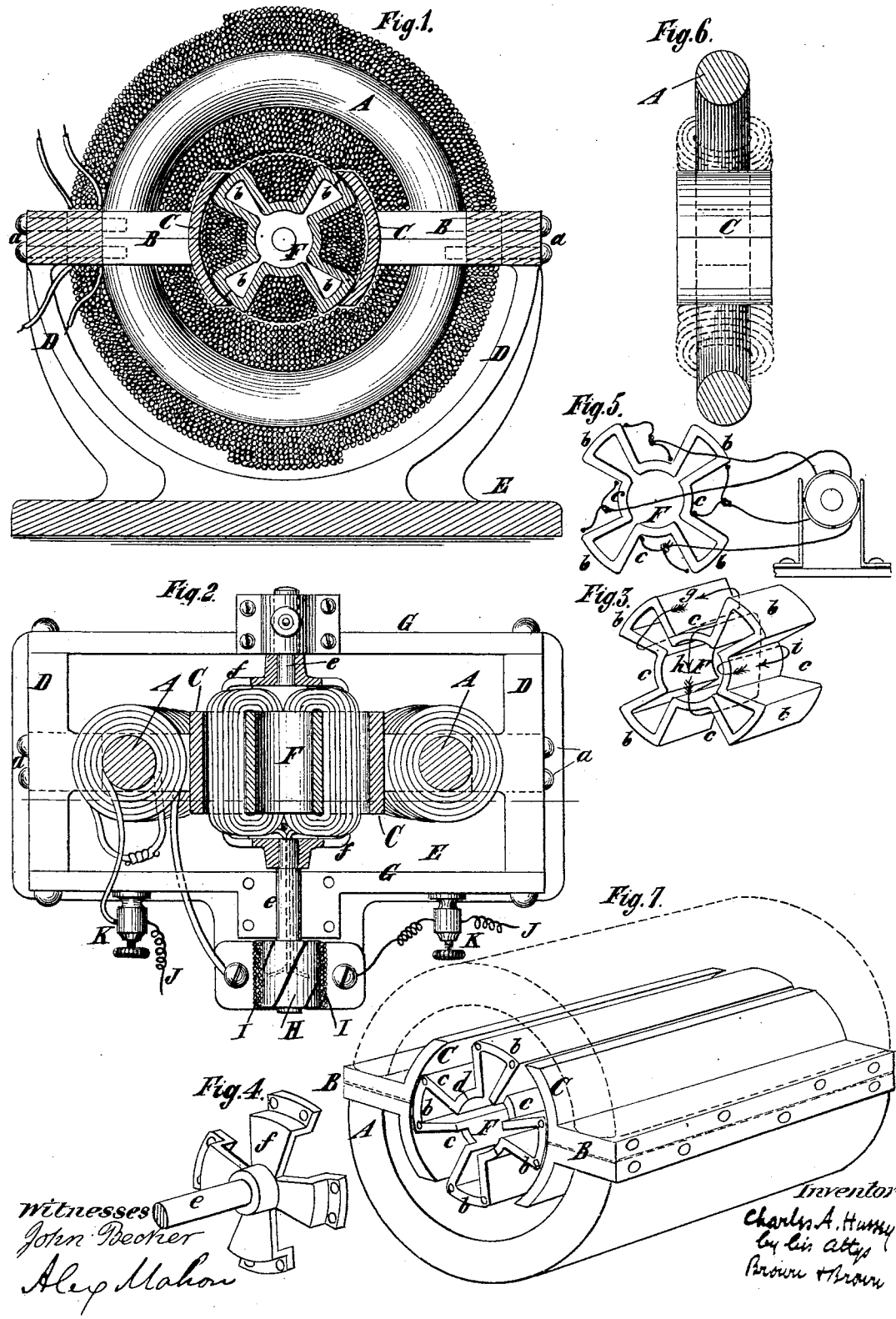

UNITED STATES PATENT OFFICE.

CHARLES A. HUSSEY, OF NEW YORK, N. Y., ASSIGNOR OF ONE-HALF OF HIS RIGHT TO AMZI S. DODD, OF SAME PLACE.

DYNAMO-ELECTRIC MACHINE.

SPECIFICATION forming part of Letters Patent No. 233,350, dated October 19, 1880.

Application filed June 29, 1880. (Model.)

*To all whom it may concern:*

Be it known that I, CHARLES A. HUSSEY, of the city, county, and State of New York, have invented certain new and useful Improvements in Dynamo-Electric Machines, of which the following is a specification.

My improvements consist in a novel form of magnet and its appurtenances, whereby increased effectiveness is afforded; also, in a novel form of armature tending to the same result; also, in the combination of said magnet and armature, whereby the armature is made to rotate before the poles or consequent points, before the whole length of the magnet and wires surrounding the same, and through the entire field of force, all at the same time, and thereby to produce improved results.

In the accompanying drawings, Figure 1 is a partial side view and partial section of a machine embodying my invention. Fig. 2 is a central longitudinal section of the same. Fig. 3 is a perspective view of the armature. Fig. 4 is a perspective view of an end plate and journal for the armature. Fig. 5 is a diagram illustrative of the method of connecting the armature-wires with the commutator. Fig. 6 is a transverse section of the magnet; and Fig. 7 is a perspective view of a modified form of magnet and the armature therefor.

Similar letters of reference designate corresponding parts in all the figures.

A designates the magnet, which, as shown in Figs. 1, 2, and 6, consists of a circular bar of cast-iron or other suitable metal round in the cross-section, and which, as shown in Fig. 7, consists of a cylinder of similar material.

B designates transverse projections from the magnet A, which, as here shown, project inwardly and radially therefrom; and C designates arc-shaped extensions from the inner ends of the said projections concentric with the magnet A.

The magnet A may be made in two semicircular sections, and the projections B and the arc-shaped extensions C correspondingly divided to facilitate the manufacture of the same. When made as just suggested the two sections of the magnet may be wound in any suitable manner, and like poles of the sections arranged in contact with or proximity to each other, and then the projections B and arc-sharped extensions C will form the poles of the magnets; but when the magnet A is made in one piece the wire on its portions at each side of the projections B will be wound in reverse directions, and then the said projections and their arc-shaped extensions C will form consequent points. The wire will be wound on the magnet A to an extent sufficient to make it on the inner side of the magnet form a continuation of the circle of which the extensions C form arcs, so that the armature before the poles or consequent points will rotate before the whole length of the magnet and wire wound thereon, and hence through the whole field of force, all at the same time, whereby the effectiveness of the machine is increased.

The section of the magnet A indicated by dotted outline in Fig. 7 shows that one section of the magnet may be omitted and the armature still have the advantage due to its rotation through the entire field of force of the other section.

The magnet is supported by standards D, erected on a base-piece, E, and having outwardly-extending portions of the projections B secured to it by screws *a* or otherwise.

F designates an armature comprising radial projections *b*, and intervening spaces *c*, on which the wire wound between the said projections is contained. As shown, it is of a skeleton-like construction, consisting of a series of arcs of a circle, another series of arcs of a larger but concentric circle arranged opposite the spaces between the arcs first named, and a number of approximately-radial portions connecting the two series of arcs. It has an opening from end to end through the center, and likewise has openings from end to end through the radial projections. Preferably, the openings through the center and the openings through the radial projections are in communication with each other, as shown. It may be formed of a single plate of metal bent into shape, or of two longitudinal sections of metal suitably bent into shape and welded together, as at *d*, or at the periphery of opposite projections. If desirable, it may be made of a cylinder with projections provided with longitudinal openings attached to it. It may also be made of plates stamped out of thin metal and secured together in close contact by bolts passing through them. In either case it will have the openings or apertures through its center and through the radial projections for the circulation of air, whereby it will be kept cool. This armature may be provided with journals in any suitable manner. I have shown it provided with journals *e* attached to skeleton cap or end plates, *f*, by screws or otherwise. These journals are supported in bearings shown as arranged in cross-bars G, extending from one to the other of the standards D.

The armature may be wound longitudinally in various ways. Wire may, for instance, be wound around its radial projections, as indicated by the arrow *g*, Fig. 3, or may be wound over two opposite spaces between the radial projections, as indicated by the arrow *h*, Fig. 3; or wire may be wound over one of the spaces between the radial projections and through the interior, as indicated by the arrow *i*, Fig. 3.

H designates the commutator, which may be of the usual or any suitable form, and is mounted on one of the journals. The wires from the commutator are led to it through holes or recesses in the said journal. The ends of the various wires wound on the armature are looped and connected by single wires to the commutator, as shown in Fig. 5. Commutator-brushes I bear against it in a well-known manner.

The wires J, for carrying off electric currents generated in the machine, are connected to binding-screws K.

By my invention I produce a very simple, compact, and effective machine, owing largely to the rotation of the armature before the poles of the magnet, before the whole length of the magnet, and the wire surrounding it, all at the same time, and thus throughout the entire field of force.

If desirable, the projections B may extend outward in lieu of inward, or transversely from the sides of the magnet A, and in such case the armature will need to be somewhat modified, and changed also as to its location.

What I claim as my invention, and desire to secure by Letters Patent, is—

1. A magnet for a dynamo-electric machine, circular or semicircular, cylindric or semi-cylindric, in form having projections extending inwardly, outwardly, or transversely from the sides, and terminating in arc-shaped extensions concentric with the magnet, the magnet being wound with wire between the projections only and preferably to such an extent that the inner surface of the wire will form a continuation of the arc-shaped extensions, substantially as and for the purpose specified.

2. An armature for a dynamo-electric machine comprising radial projections and intervening spaces, having an opening through the center and openings through the radial projections, substantially as specified.

3. In a dynamo-electric machine, the combination of a magnet of circular, semicircular, cylindric, or semi-cylindric form, wound as described, and provided with projections extending inward, outward, or transversely from the sides, and terminating in arc-shaped extensions, and an armature provided with radial projections and intervening spaces, and having an opening through the center and openings through the radial projections, substantially as and for the purpose specified.

C. A. HUSSEY.

Witnesses:
T. J. KEANE,
EDWIN H. BROWN.